United States Patent
Miyajima et al.

(10) Patent No.: US 7,583,978 B2
(45) Date of Patent: Sep. 1, 2009

(54) TECHNOLOGY FOR CONTROLLING WIRELESS COMMUNICATION

(75) Inventors: Shinichirou Miyajima, Fukuoka (JP); Kazuhiro Ichiyanagi, Kawasaki (JP); Akiko Kusumoto, Kawasaki (JP); Yuji Nagano, Fukuoka (JP); Iwao Hashizume, Fukuoka (JP); Kazuyuki Inomoto, Fukuoka (JP); Jun Endoh, Fukuoka (JP); Toshikazu Senuki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 561 days.

(21) Appl. No.: 11/239,033

(22) Filed: Sep. 30, 2005

(65) Prior Publication Data

US 2006/0019675 A1    Jan. 26, 2006

Related U.S. Application Data

(63) Continuation of application No. PCT/JP03/08303, filed on Jun. 30, 2003.

(51) Int. Cl.
*H04B 7/00* (2006.01)
*H04Q 7/20* (2006.01)

(52) U.S. Cl. ............... 455/525; 455/436; 455/442; 455/432.1; 455/226.1; 370/331; 370/332

(58) Field of Classification Search ......... 455/436–444, 455/525, 514, 226.1, 226.2, 432.1, 456.1, 455/456.6; 370/331.332, 328
See application file for complete search history.

(56) References Cited

U.S. PATENT DOCUMENTS 6,400,953 B1 * 6/2002 Furukawa ............... 455/442

| | | | | |
|---|---|---|---|---|
| 6,564,057 B1 * | 5/2003 | Chun et al. | ............... | 455/437 |
| 6,745,034 B2 * | 6/2004 | Wang et al. | ............... | 455/441 |
| 6,748,222 B1 * | 6/2004 | Hashem et al. | ............ | 455/453 |
| 6,813,508 B1 * | 11/2004 | Shioda et al. | ............. | 455/525 |
| 7,149,486 B2 * | 12/2006 | Kurose | ................. | 455/226.2 |
| 2002/0072363 A1 * | 6/2002 | Riihinen et al. | ........... | 455/432 |
| 2003/0176189 A1 * | 9/2003 | Merson et al. | ............ | 455/436 |
| 2004/0147264 A1 * | 7/2004 | Ogawa | ..................... | 455/441 |

FOREIGN PATENT DOCUMENTS

| | | |
|---|---|---|
| JP | 62-92528 | 4/1987 |
| JP | 5-91038 | 4/1993 |
| JP | 7-87544 | 3/1995 |
| JP | 9-224275 | 8/1997 |
| JP | 11-331941 | 11/1999 |
| JP | 200-27519 | 1/2002 |
| JP | 2002-345007 | 11/2002 |

OTHER PUBLICATIONS

Office Action mailed on Aug. 5, 2008 and issued in corresponding Japanese Patent Application No. 2005-503371.

* cited by examiner

*Primary Examiner*—Sujatha Sharma
(74) *Attorney, Agent, or Firm*—Staas & Halsey LLP (57) ABSTRACT

A mobile terminal is carried by a moving object, and the mobile station is configured to perform wireless communications with a base terminal from among a plurality of base stations. The mobile station acquires a communication status between itself and at least a first base station and a second base station from among the plurality of base stations. The mobile station performs wireless communications with a base station from among the first base station and the second base station of which the communication status satisfies a communication condition that is most distant.

10 Claims, 11 Drawing Sheets

| BASE STATION ID | POSITION INFOR-MATION | THRESH-OLD INFOR-MATION | COMMUNICATION STATUS INFORMATION (RADIO-FIELD-INTENSITY LEVEL, PACKET LOSS LEVEL) | | | | |
|---|---|---|---|---|---|---|---|
| | | | TIME N-M | ... | TIME N-2 | TIME N-1 | TIME N (PRESENT) |
| 1 | X1 | (6,5) | (10,0) | ... | (9,0) | (6,5) | (5,5) |
| 2 | X2 | (6,5) | (9,1) | ... | (10,0) | (7,4) | (6,4) |
| 3 | X3 | (6,5) | (8,2) | ... | (8,1) | (8,3) | (7,4) |
| 4 | X4 | (6,5) | (7,3) | ... | (7,2) | (6,4) | (8,3) |
| 5 | X5 | (6,5) | (7,3) | ... | (6,3) | (5,5) | (6,4) |
| 6 | X6 | (6,5) | (6,4) | ... | (6,4) | (4,6) | (5,6) |
| 7 | X7 | (6,5) | (5,5) | ... | (5,4) | (4,7) | (4,7) |
| AVERAGE BY TIME | | | (7,2) | | (7,2) | (5,4) | (5,4) |

TECHNOLOGY FOR CONTROLLING WIRELESS COMMUNICATION

This application is a continuing application, filed under 35 U.S.C. §111(a), of International Application PCT/JP2003/008303, filed Jun. 30, 2003, incorporated by reference herein.

BACKGROUND OF THE INVENTION

1. Field of the Invention

The present invention relates to a technology for controlling wireless connection between a mobile terminal and a plurality of base stations.

2. Description of the Related Art

When there is a heavy rain or a flood, road conditions are monitored to check whether the roads are flooded or caved in.

One approach is to mount a video camera on a car and take videos of the road and transmit the videos real-time to a management center where a person can make decisions about the road conditions. Generally, such videos are transmitted from a mobile terminal mounted on the vehicle to a base station by wireless communication, and the base station transmits the video to the management center by wireless or cable communication. Because the mobile terminal mounted on a car and the car is moving, a relative position of the mobile terminal and the base stations change with time, and therefore, a roaming technology needs to be employed.

When the mobile terminal moves out of an area of one base station, the mobile terminal switches the wireless connection to another nearest base station. A conventional technology has been disclosed in Japanese Patent Application Laid Open No. H11-331941.

However, when the wireless connections are switched, some data is lost so that communication is interrupted. Data is lost during the time from when communication with earlier base station is cut and when communication with the next base station is established. Accordingly, if the car is moving fast, wireless connections are switched more frequently, and therefore, communication is interrupted often. The problem of interruption in communication becomes severe when large amount of data are to be transmitted.

SUMMARY OF THE INVENTION

It is an object of the present invention to at least solve the problems in the conventional technology.

According to one aspect of the present invention, a mobile terminal is configured to perform wireless communications with a base station at a time from among a plurality of base stations. The mobile terminal includes an acquiring unit that acquires a communication status between the mobile terminal and at least a first base station and a second base station from among the plurality of base stations; and a communication unit that performs wireless communications with a base station from among the first base station and the second base station of which the communication condition satisfies a predetermined condition and that is most distant from the mobile terminal.

According to another aspect of the present invention, a communications controlling system includes at least one mobile terminal and a plurality of base stations, and that controls wireless communication between the mobile station and a base station from among the base stations. The communications controlling system includes an acquiring unit that acquires a communication status between the mobile terminal and at least a first base station and a second base station from among the plurality of base stations; and a communication unit that establishes wireless communications of the mobile station with a base station from among the first base station and the second base station of which the communication condition satisfies a predetermined condition and that is most distant from the mobile terminal.

According to another aspect of the present invention, a method of controlling wireless communications of at least one mobile terminal with a base terminal from among a plurality of base stations includes acquiring a communication status between the mobile terminal and at least a first base station and a second base station from among the plurality of base stations; and establishes wireless communications of the mobile station with a base station from among the first base station and the second base station of which the communication condition satisfies a predetermined condition and that is most distant from the mobile terminal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described below with reference to accompanying drawings. The present invention is not limited to these embodiments.

According to a first embodiment, a mobile terminal is wirelessly connected to a base station, and wireless communication is performed therebetween. When a communication status deteriorates between the mobile terminal and the base station, the mobile terminal searches for another more appropriate base station, and switches the connection to a base station found.

Figure 1:
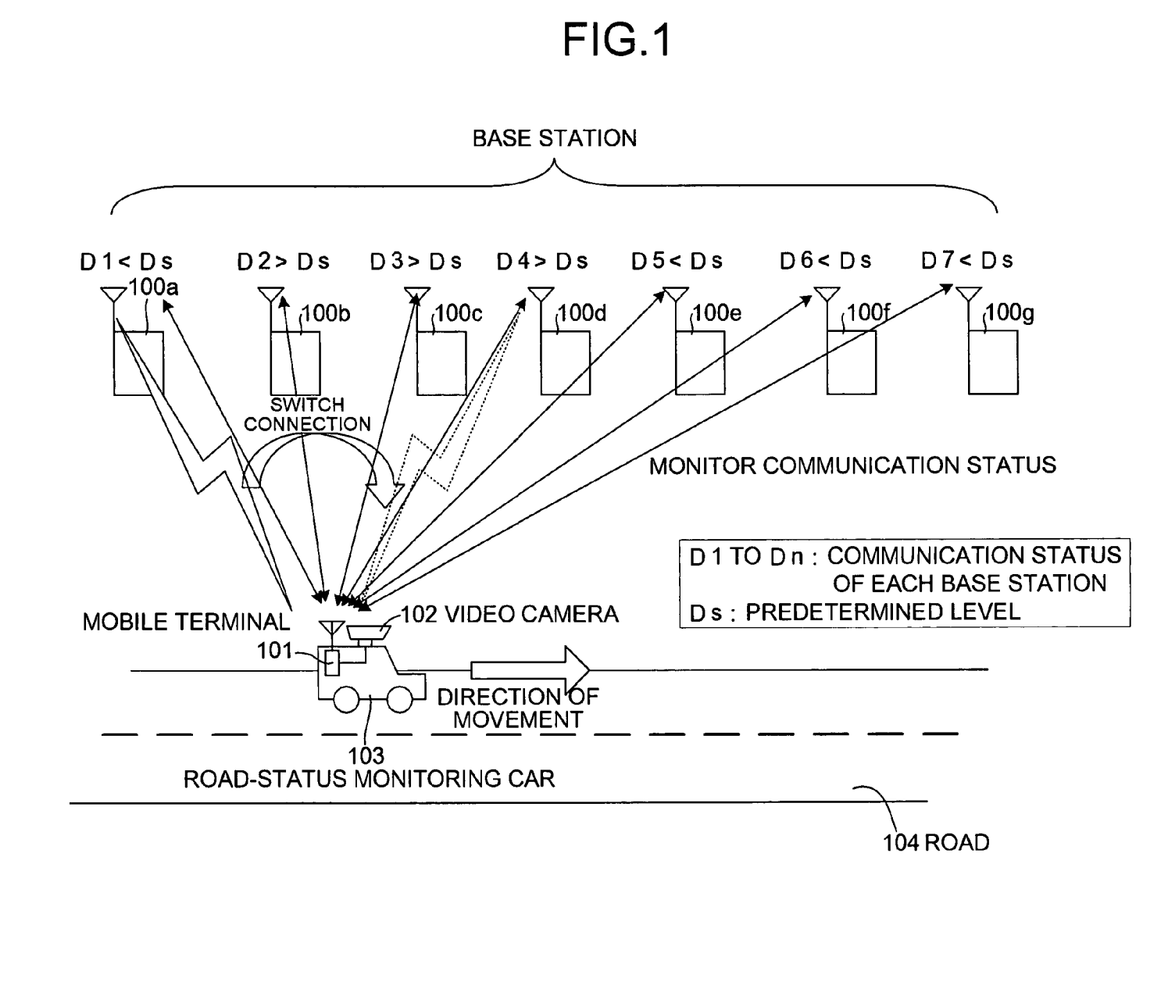
FIG. 1 is a diagram for describing a concept of a switching processing according to a first embodiment.

FIG. 1 is a diagram for describing a concept of a switching processing according to the first embodiment. A video camera 102 and a mobile terminal 101 are mounted on a car 103 that runs on a road 104. A plurality of base stations 100a to 100g is arranged near the road 104 at certain interval.

The mobile terminal 101 is configured to perform radio communications with any of the base stations 100a to 100g. A video recorded by the video camera 102 is transmitted to the base stations 100a to 100g.

The mobile terminal 101 exchanges beacon signals with the base stations 100a to 100g to monitor radio field intensity and packet loss, and to perceive communication statuses between the base stations 100a to 100g.

If communications with a base station 100a becomes difficult, the mobile terminal 101 searches for another more appropriate base station among the base stations 100b to 100g. When searches for a base station, the mobile terminal 101 determines communication statuses of the base station with which communications is possible, and selects a base station that has a communication status that is higher than a predetermined value and that is most away from the mobile terminal 101. In FIG. 1, Ds is a threshold level and D1 to D7 are communication levels between the mobile terminal 101 and the base stations 100a to 100g. D3 and D4 are greater than Ds, however, 100d is most distant from the mobile station 101 so that the mobile station 101 will switch to the base station 100d.

Therefore, the mobile terminal 101 can perform communications for a longer time, because the selected base station is most away; therefore, is required to switch communications less frequently, and hence, data communication is interrupted less frequently, so that a sufficient level of communication quality is maintained.

Figure 2:
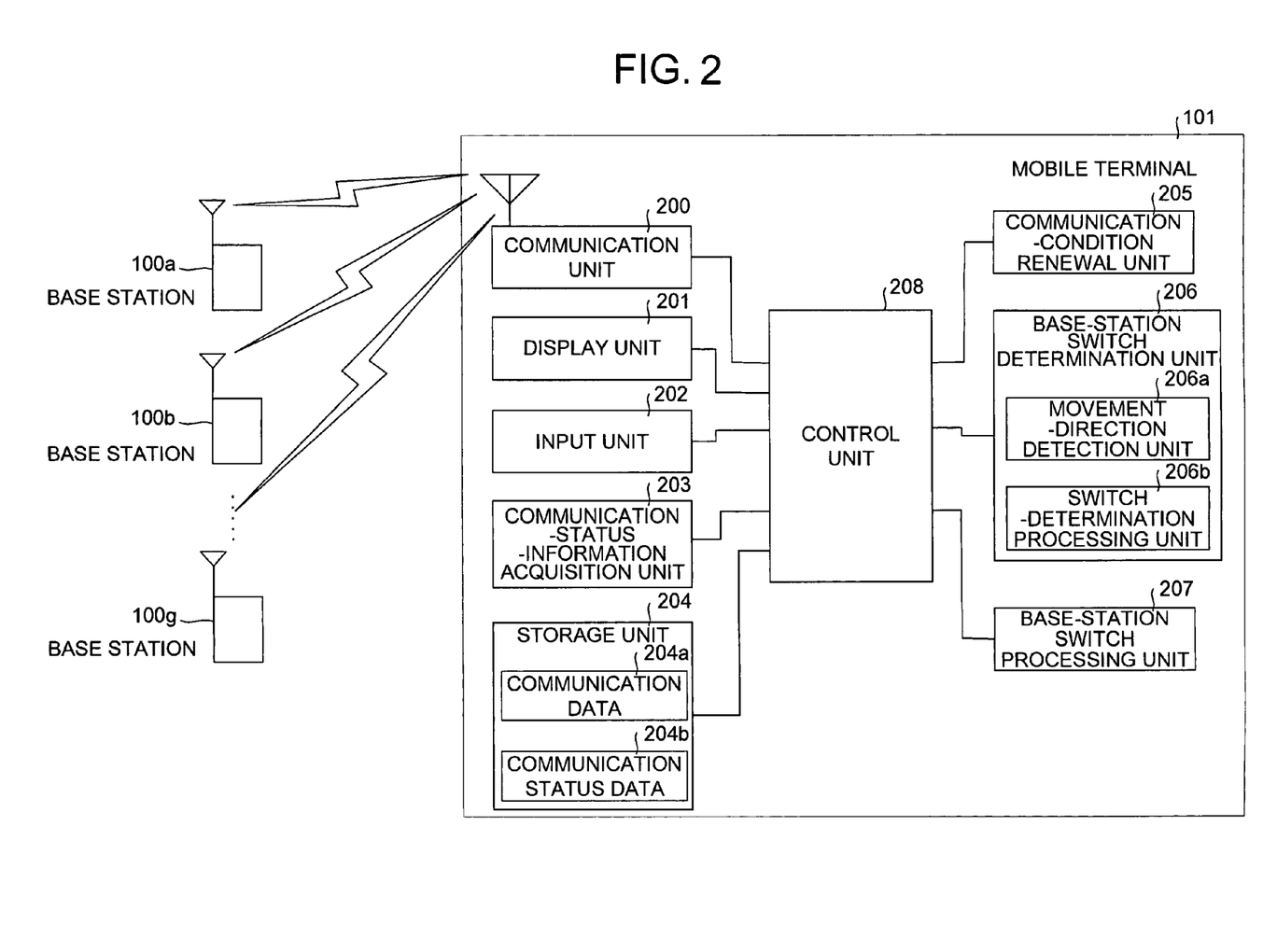
FIG. 2 is a functional block diagram of a mobile terminal shown in FIG. 1.

FIG. 2 is a functional block diagram of the mobile terminal 101 shown in FIG. 1.

The mobile terminal 101 includes a communication unit 200, a display unit 201, an input unit 202, a communication-status-information acquisition unit 203, a storage unit 204, a communication-condition renewal unit 205, a base-station switch determination unit 206, a base-station switch processing unit 207, and a control unit 208.

The communication unit 200 establishes a wireless network among the base stations 100a to 100g, and exchanges data and control signals with the base stations 100a to 100g. When a packet loss occurs, the communication unit 200 transmits an automatic repeat request (ARQ) to the base stations 100a to 100g to request more packets. The display unit 201 is a display device such as a liquid crystal panel or a display screen. The input unit 202 is an input device such as a keyboard or a touch panel.

The communication-status-information acquisition unit 203 acquires information on communication statuses between the mobile terminal 101 and the base stations 100a to 100g with beacon signals. The information includes radio field intensity of radio waves, and packet loss of data, both transmitted from each of the base stations 100a to 100g. The communication-status-information acquisition unit 203 monitors the information and performs a processing to acquire the information.

In the present embodiment, both the radio field intensity and the packet loss are acquired. Similar results can be obtained by acquiring either one of the radio field intensity or the packet loss, or by acquiring another type of data representing a communication status such as a signal-to-noise (S/N) ratio.

The storage unit 204 is a storage device such as a memory and a hard disk device. The storage unit 204 stores communication data 204a and communication status data 204b. The communication data 204a is data to be transmitted to the base stations 100a to 100g, and data received from the base stations 100a to 100g.

Figure 3:
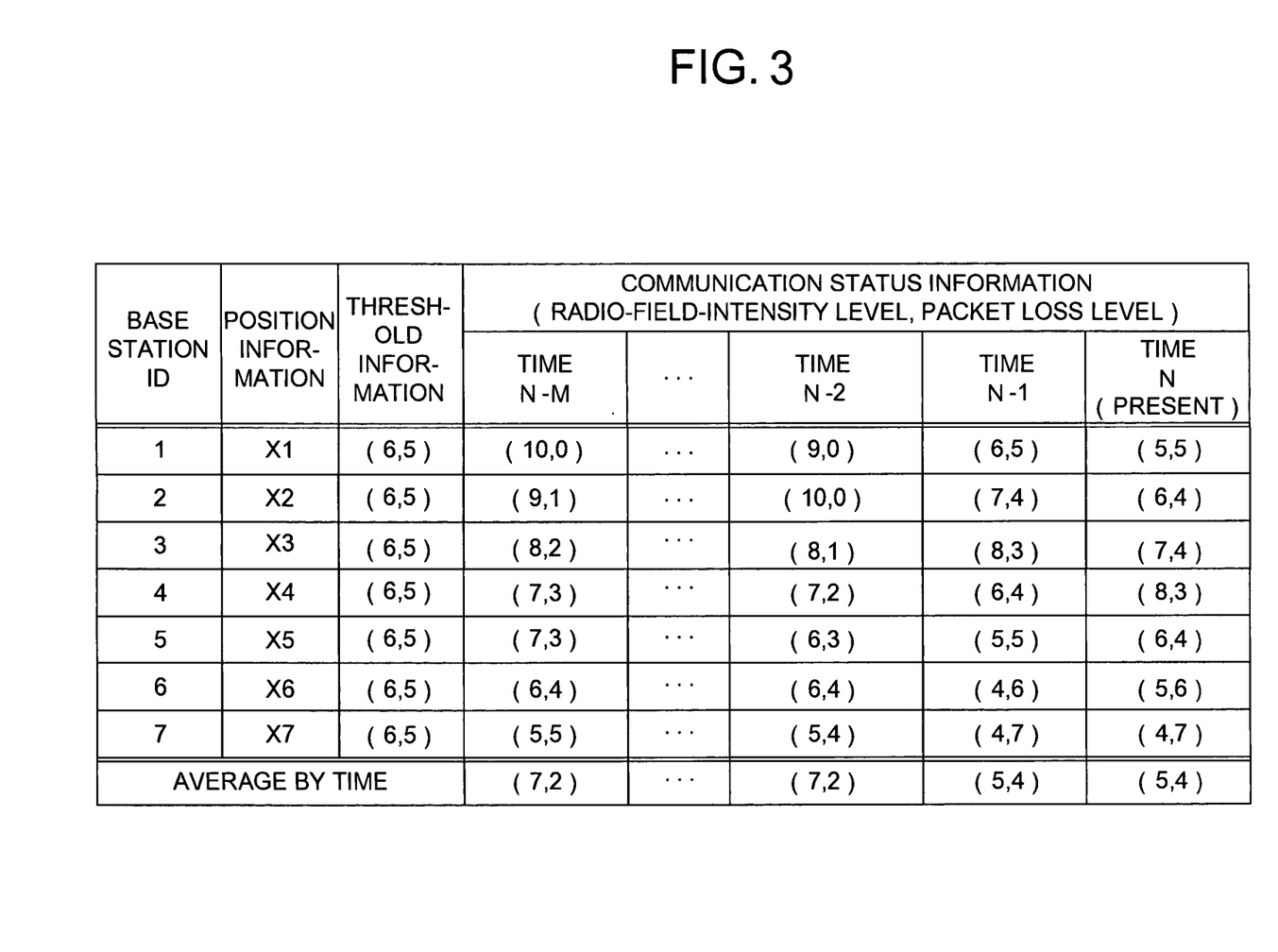
FIG. 3 is an example of communication status data shown in FIG. 2.

The communication status data 204b is data storing information relevant to communication statuses between the mobile terminal 101 and the base stations 100a to 100g. FIG. 3 is an example of the communication status data 204b shown in FIG. 2.

The communication status data 204b includes base station identification (ID), position information, threshold information, communication status information, and average by time. The base station ID identifies the base stations 100a to 100g. Each of the base stations 100a to 100g has a unique base station ID. The position information specifies a position of each base station.

The mobile terminal 101 refers to the threshold information to determine whether to switch a connection from one base station to another. The threshold information is stored in a format of (threshold of radio-field-intensity level; threshold of packet loss level).

When a radio-field-intensity level is lower than the threshold, or when a packet loss level is higher than the threshold, the switching processing is performed. A higher radio-field-intensity level corresponds to larger radio field intensity, and a lower packet loss level corresponds to a smaller amount of packet loss.

The base stations 100a to 100g have the same threshold in the example shown in FIG. 3. However, each of the base stations 100a to 100g can have different thresholds.

The communication status information stores a radio-field-intensity level of a radio wave and a packet loss level of data, both received from each of the base stations 100a to 100g, at each time of N−M, . . . , N−2, N−1, N (present). The information is stored in a format of (radio-field-intensity level; packet loss level).

The mobile terminal 101 detects a direction in which the mobile terminal 101 is moving by referring to the communication status data 204b. Specifically, the mobile terminal 101 tracks a base station among the base stations 100a to 100g, which is indicating the highest radio-field-intensity level and the lowest packet loss level at each time, and refers to the position information of each base station 100a to 100g.

In FIG. 3, the base station indicating the highest radio-field-intensity level and the lowest packet loss level changes from a base station of ID 1 to a base station of ID 4, between the time N−M and the time N. Accordingly, the mobile terminal 101 detects that the mobile terminal 101 is moving in a direction from a position X1 to a position X4.

A global positioning system (GPS) can be employed for detecting a direction of movement.

Between the time N−M and the time N, the highest radio-field-intensity level changes from 10 to 8, and the lowest packet loss level changes from 0 to 3. Such changes occur when a communication status deteriorates due to changes in the environment such as rain.

The average by time is an average of the radio-field-intensity level and an average of the packet loss level indicated by the base stations 100a to 100g at a certain time. The average by time is stored in a format of (average of radio-field-intensity level; average of packet loss level). Changes in the average by time are caused by changes in the environment such as rain.

Between the time N−2 and the time N−1, the average by time changes from (7, 2) to (5, 4), i.e., the radio-field-intensity level declines by two levels, and the packet loss level rises by two levels.

In this case, a communication condition is alleviated by lowering the threshold of the radio-field-intensity level by one level, and raising the threshold of the packet loss level by one level. The threshold can be renewed in various ways according to the environment.

Referring back to FIG. 2, the communication-condition renewal unit 205 renews a threshold stored in the communication status data 204b. Specifically, the communication-condition renewal unit 205 monitors the average by time, and when the average by time changes, the communication-condition renewal unit 205 changes the threshold of radio-field-intensity level and/or the threshold of packet loss level.

The base-station switch determination unit 206 determines whether to switch the connection to another base station among base stations 100a to 100g. The base-station switch determination unit 206 includes a movement-direction detection unit 206a and a switch-determination processing unit 206b.

The movement-direction detection unit 206a detects a direction in which the mobile terminal 101 is moving, based on a radio-field-intensity level and a packet loss level of each of the base stations 100a to 100g at each time. Specifically, the movement-direction detection unit 206a tracks a base station among the base stations 100a to 100g indicating the highest radio-field-intensity level and the lowest packet loss level at each time, and refers to the position information of each of the base stations 100a to 100g, to determine the direction.

The switch-determination processing unit 206b monitors a radio-field-intensity level of a radio wave or a packet loss level of data, both received from a base station among the base stations 100a to 100g to which the mobile terminal 101 is connected. When the radio-field-intensity level is lower than a threshold, or the packet loss level is higher than a threshold, the switch-determination processing unit 206b determines to switch the connection to another more appropriate base station among the base stations 100a to 100g.

A more appropriate base station satisfies the following conditions: is able to perform communication in an area towards which the mobile terminal 101 is moving; indicates a radio-field-intensity level higher than the threshold; indicates a packet loss level lower than the threshold; and is located furthest from the mobile terminal 101.

The location of the mobile terminal 101 can be tracked according to positions of the base stations indicating the highest radio-field-intensity level and the lowest packet loss level at each time. The base station that is furthest from the mobile terminal 101 can be identified from the position information of the mobile terminal 101 and the position information of each of the base stations 100a to 100g.

When the base-station switch determination unit 206 determines to switch the connection to another base station, the base-station switch processing unit 207 cuts off the connection between the mobile terminal 101 and the base station, and establishes a connection between the mobile terminal 101 and another base station among the base stations 100a to 100g.

The control unit 208 controls each unit in the mobile terminal 101, and commands exchange of data between the units. For example, data of a radio-field-intensity level or a packet loss level acquired by the communication-status-information acquisition unit 203 is stored in the storage unit 204 as the communication data 204a by the control unit 208.

Figure 4:
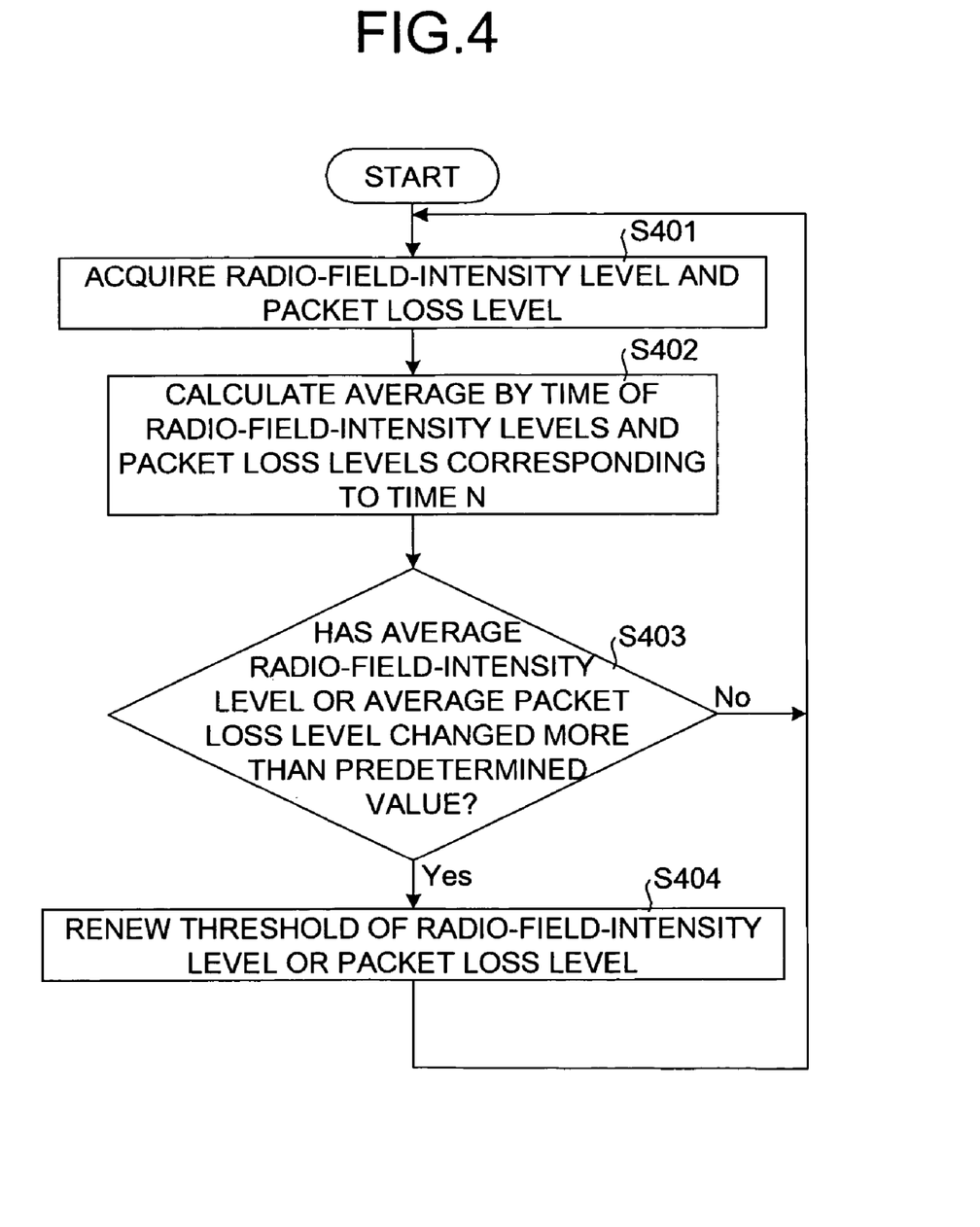
FIG. 4 is a flowchart of a threshold-renewal processing procedure performed by the mobile terminal.

FIG. 4 is a flowchart of a threshold-renewal processing procedure performed by the mobile terminal 101 shown in FIG. 2.

The mobile terminal 101 acquires a radio-field-intensity level and a packet loss level between the mobile terminal 101 and each of the base stations 100a to 100g (step S401). The mobile terminal 101 calculates an average by time of the radio-field-intensity levels and the packet loss levels corresponding to a time N at which the information is acquired in step S401 (step S402).

The mobile terminal 101 determines whether the average radio-field-intensity level or the average packet loss level calculated at step S402 has changed more than a predetermined value (step S403). When the result of the determination made at step S403 is NO, the system control returns to step S401. When the result of the determination made at step S403 is YES, the mobile terminal 101 renews a threshold of the radio-field-intensity level or the packet loss level (step S404).

Figure 5:
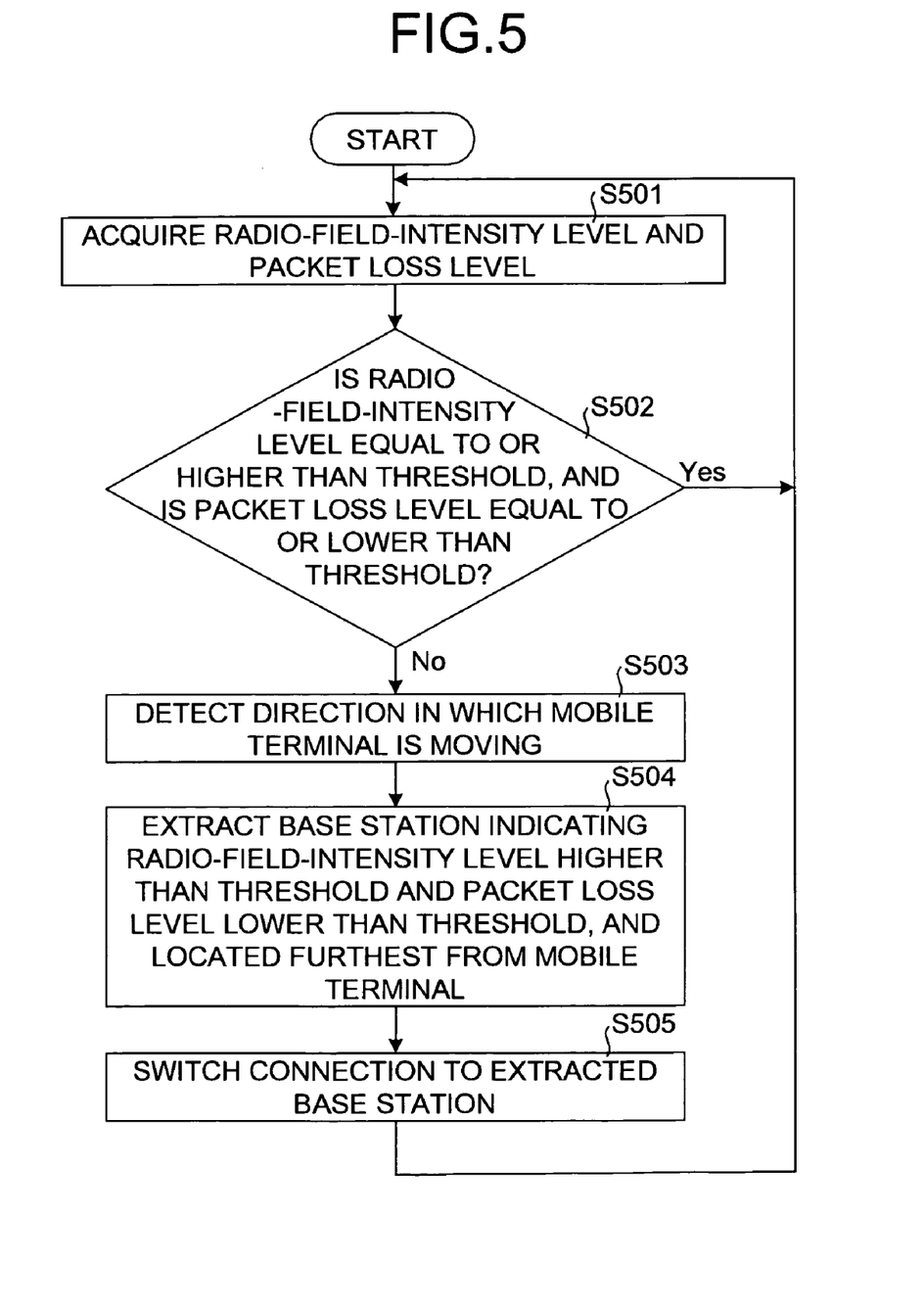
FIG. 5 is a flowchart of a base-station switching processing performed by the mobile terminal.

FIG. 5 is a flowchart of a base-station switching processing performed by the mobile terminal 101 shown in FIG. 2.

The mobile terminal 101 acquires a radio-field-intensity level and a packet loss level between the mobile terminal 101 and each of the base stations 100a to 100g (step S501). Regarding the base station to which the mobile terminal 101 is connected, the mobile terminal 101 determines whether a radio-field-intensity level is equal to or higher than a threshold, and whether a packet loss level is equal to or lower than a threshold (step S502).

When the result of the determination made at step S502 is YES, the system control returns to step S501.

When the result of the determination made at step S502 is NO, the mobile terminal 101 refers to the communication data 204a for the highest radio-field-intensity level or the lowest packet loss level, and detects a direction in which the mobile terminal 101 is moving (step S503).

The mobile terminal 101 extracts from the base stations 100a to 100g a base station that is indicating a radio-field-intensity level higher than the threshold and a packet loss level lower than the threshold, and that is located furthest from the mobile terminal 101 (step S504). The mobile terminal 101 switches the connection to the extracted base station (step S505).

According to the first embodiment, when a communication status deteriorates between the mobile terminal 101 and one of the base stations 100a to 100g, and a radio-field-intensity level becomes lower than a threshold or a packet loss level becomes higher than a threshold, the mobile terminal 101 switches the connection to another more appropriate base station among the base stations 100a to 100g. A more appropriate base station is able to perform communication in an area towards which the mobile terminal 101 is moving, indicates a radio-field-intensity level higher than the threshold and a packet loss level lower than the threshold, and is located furthest from the mobile terminal 101. Accordingly, the mobile terminal 101 is required to switch a connection from one base station to another less frequently, and therefore, data communication is interrupted less frequently, so that a sufficient level of communication quality is maintained.

According to a second embodiment, a base station connected to a mobile terminal searches for another more appropriate base station, and switches the connection to another base station.

Figure 6:
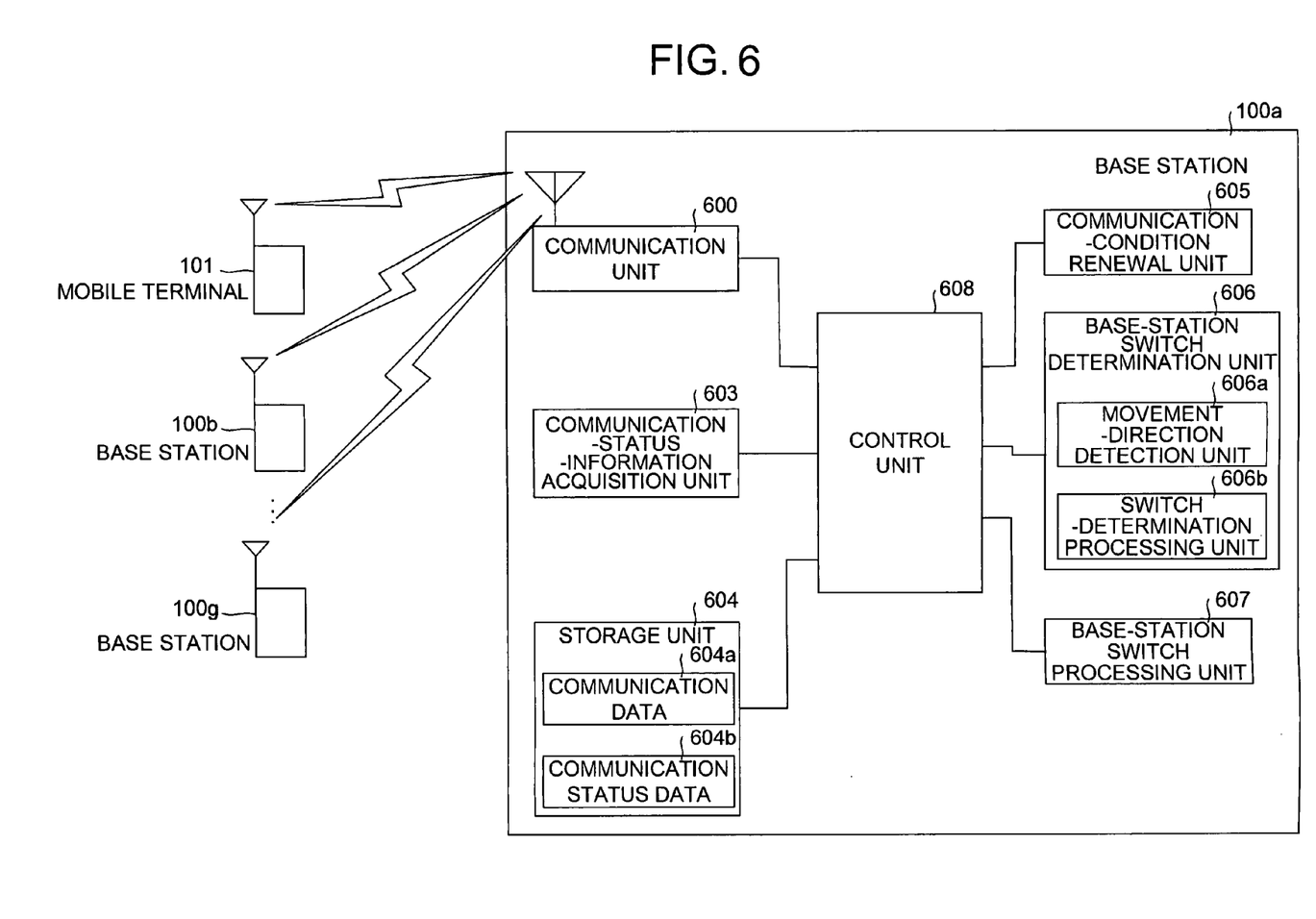
FIG. 6 is a functional block diagram of a base station according to a second embodiment.

FIG. 6 is a functional block diagram of a base station 100a according to the second embodiment.

The base station 100a includes a communication unit 600, a communication-status-information acquisition unit 603, a storage unit 604, a communication-condition renewal unit 605, a base-station switch determination unit 606, a base-station switch processing unit 607, and a control unit 608.

The communication unit 600 establishes a wireless network among the mobile terminal 101 and the base stations 100a to 100g, and exchanges data and control signals with the mobile terminal 101 and the base stations 100b to 100g.

The communication-status-information acquisition unit 603 acquires a radio-field-intensity level and a packet loss level between the mobile terminal 101 and each of the base stations 100a to 100g.

The storage unit 604 is a storage device such as a memory and a hard disk device. The storage unit 604 stores communication data 604a and communication status data 604b. The communication data 604a is data to be transmitted to the mobile terminal 101 and the base stations 100b to 100g, and data received from the mobile terminal 101 and the base stations 100b to 100g. The communication status data 604b is data storing information relevant to communication statuses between the mobile terminal 101 and each of the base stations 100a to 100g, similarly to the communication status data 204b shown in FIG. 3.

The communication-condition renewal unit 605 renews a threshold stored in the communication status data 604b, when the base station 100a is connected to the mobile terminal 101. Specifically, the communication-condition renewal unit 605 renews the threshold based on radio-field-intensity levels and packet loss levels transmitted from each of the base stations 100b to 100g.

The renewed radio-field-intensity level threshold or the renewed packet loss level threshold is transmitted to the other base stations 100b to 100g, and each of the base stations 100b to 100g renews the threshold stored therein based on the threshold received from the base station 100a.

The thresholds of the base stations 100a to 100g can be renewed with a processing performed by a base station that is not connected to the mobile terminal 101.

Moreover, each of the base stations 100a to 100g can renew a threshold stored therein based on radio-field-intensity levels and packet loss levels received from other base stations. In this case, the renewed threshold is not transmitted to other base stations.

The base-station switch determination unit 606 determines whether to switch the connection with the mobile terminal 101 to another base station among base stations 100a to 100g, based on radio-field-intensity levels and packet loss levels acquired by the communication-status-information acquisition unit 603. The base-station switch determination unit 606 includes a movement-direction detection unit 606a and a switch-determination processing unit 606b.

The movement-direction detection unit 606a detects a direction in which the mobile terminal 101 is moving, based on the highest radio-field-intensity level and the lowest packet loss level of the base stations 100a to 100g at each time, stored in the communication status data 604b.

The switch-determination processing unit 606b monitors a radio-field-intensity level of a radio wave or a packet loss level of data between the mobile terminal 101 and the base station 100a. When the radio-field-intensity level is lower than a threshold, or the packet loss level is higher than a threshold, the switch-determination processing unit 606b determines to switch the connection to another more appropriate base station among the base stations 100b to 100g.

A more appropriate base station satisfies the following conditions: is able to perform communication in an area towards which the mobile terminal 101 is moving, as detected by the movement-direction detection unit 606a; indicates a radio-field-intensity level higher than the threshold; indicates a packet loss level lower than the threshold; and is located furthest from the mobile terminal 101.

The control unit 608 controls each unit in the base station 100a, and commands exchange of data between the units.

Figure 7:
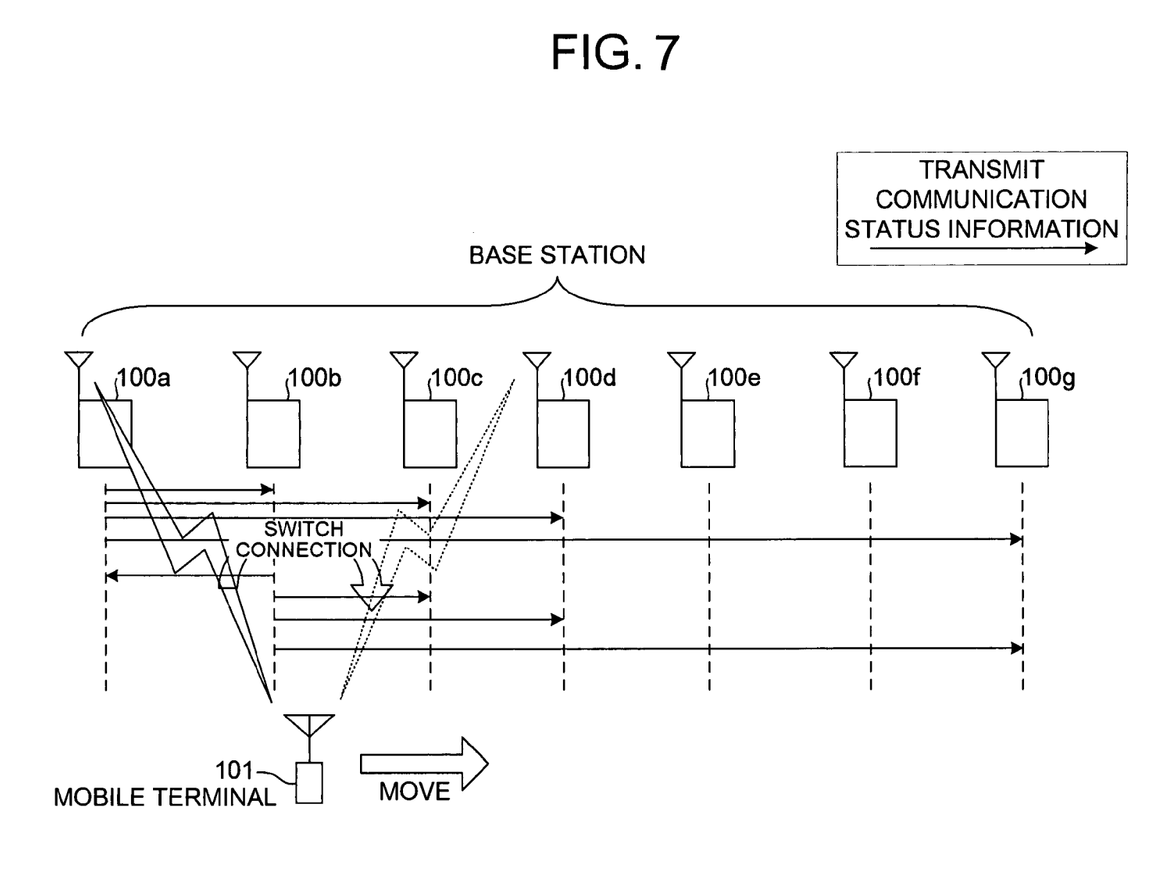
FIG. 7 is a diagram for describing a processing performed by the base station according to the second embodiment for transmitting communication statuses to other base stations.

FIG. 7 is a diagram for describing a processing performed by a base station for transmitting information on communication statuses to other base stations.

The base station 100a is wirelessly connected to the mobile terminal 101, and transmits a radio-field-intensity level and a packet loss level of the communication between the mobile terminal 101 to the other base stations 100b to 100g. The information can be transmitted at once by simultaneous multi-destination communication, or transmitted sequentially to one base station after another.

Moreover, the information transmitted to the other base stations 100b to 100g is not limited to communication statuses; the information can be a threshold or an instruction to switch communication to another base station.

Furthermore, the information need not be transmitted directly from the base station 100a to each of the base stations 100b to 100g; the information can be transmitted to a destination base station through another base station.

Figure 8:
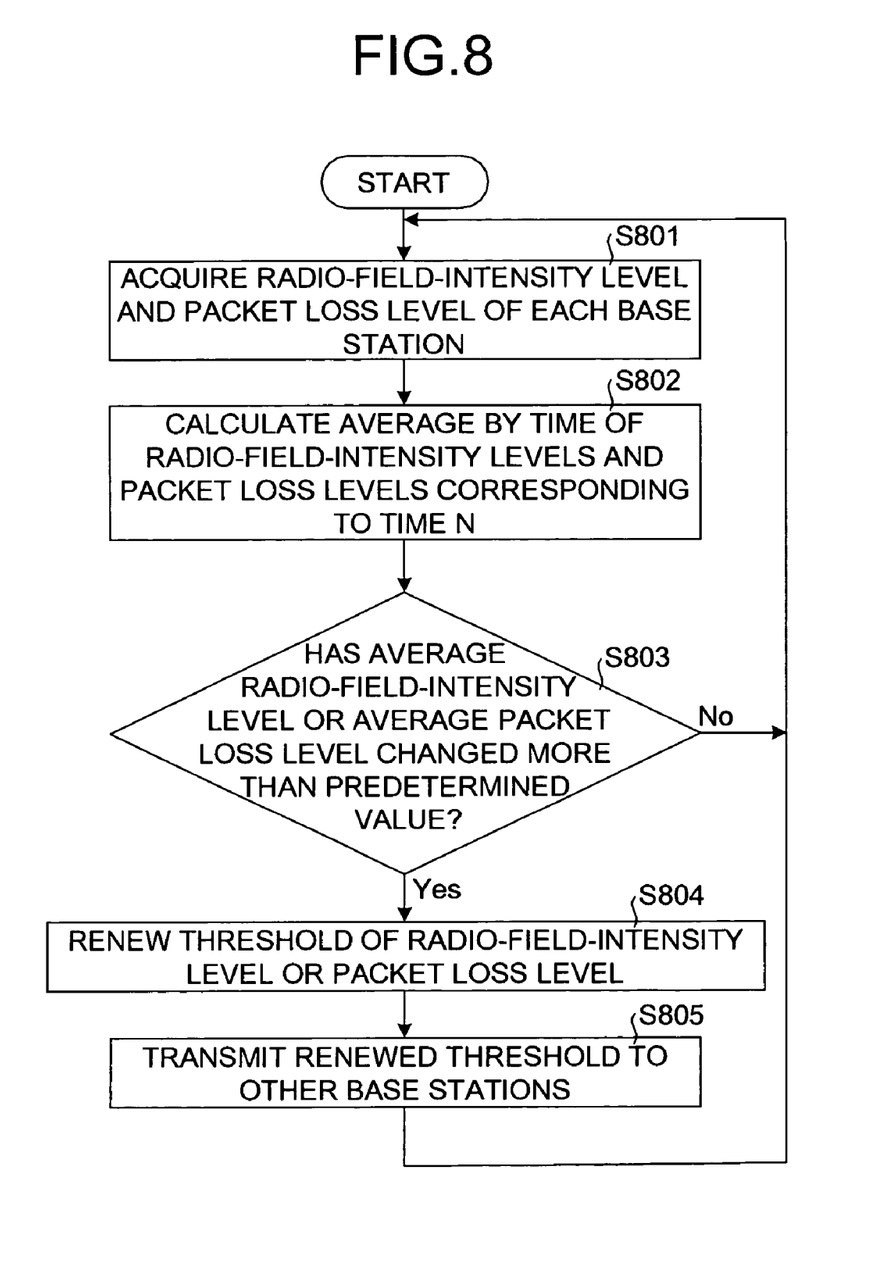
FIG. 8 is a flowchart of a threshold-renewal processing procedure performed by the base station according to the second embodiment.

FIG. 8 is a flowchart of a threshold-renewal processing procedure performed by the base station 100a according to the second embodiment. It is assumed that the base station 100a is connected to the mobile terminal 101 when performing the threshold-renewal processing procedure.

The base station 100a acquires a radio-field-intensity level and a packet loss level between the mobile terminal 101 and each of the base stations 100a to 100g (step S801). The base station 100a calculates an average by time of the radio-field-intensity levels and the packet loss levels corresponding to a time N at which the information is acquired in step S801 (step S802).

The base station 100a determines whether the average radio-field-intensity level or the average packet loss level calculated at step S802 has changed more than a predetermined value (step S803). When the result of the determination made at step S803 is NO, the system control returns to step S801. When the result of the determination made at step S803 is YES, the base station 100a renews a threshold of the radio-field-intensity level or the packet loss level, stored in the base station 100a (step S804). The base station 100a transmits the renewed threshold to the other base stations 100b to 100g (step S805). Each of the base stations 100b to 100g renews a threshold stored therein according to the received threshold.

The base station 100a performs the same base-station switching processing as that performed by the mobile terminal 101 shown in FIG. 2.

According to the second embodiment, when a communication status deteriorates between the mobile terminal 101 and the base station 100a, and a radio-field-intensity level becomes lower than a threshold or a packet loss level becomes higher than a threshold, the base station 100a switches the connection so that the mobile terminal 101 is connected to another more appropriate base station among the base stations 100b to 100g. A more appropriate base station is able to perform communication in an area towards which the mobile terminal 101 is moving, indicates a radio-field-intensity level higher than the threshold and a packet loss level lower than the threshold, and is located furthest from the mobile terminal 101. Accordingly, the mobile terminal 101 is required to switch a connection from one base station to another less frequently, and therefore, data communication is interrupted less frequently, so that a sufficient level of communication quality is maintained.

According to a third embodiment, each of the base stations renews a threshold therein based on radio-field-intensity levels and packet loss levels received from the other base stations, and determines whether communication is possible between a mobile terminal based on the renewed threshold, and notifies the other base stations of a result of the determination.

The third embodiment is described with reference to FIG. 6. Descriptions overlapping with those of the second embodiment are omitted.

The base station 100a according to the third embodiment includes a communication unit 600, a communication-status-information acquisition unit 603, a storage unit 604, a communication-condition renewal unit 605, a base-station switch determination unit 606, a base-station switch processing unit 607, and a control unit 608.

The communication-condition renewal unit 605 renews a threshold stored in the communication status data 604b. Specifically, the communication-condition renewal unit 605 renews the threshold based on radio-field-intensity levels and packet loss levels transmitted from the base stations 100a to 100g.

Based on the renewed threshold, the base station 100a determines whether the base station 100a is able to communicate with the mobile terminal 101. The result of the determination is referred to as "communication possibility data", which is transmitted to the other base stations 100b to 100g. Unlike the second embodiment, the renewed threshold is not transmitted to the other base stations 100b to 100g.

The communication-condition renewal unit 605 acquires communication possibility data from the other base stations 100b to 100g.

The base-station switch determination unit 606 monitors whether a radio-field-intensity level of a radio wave received from the base station communicating with the mobile terminal 101 is lower than the threshold, or a packet loss level of data received from the base station communicating with the mobile terminal 101 is higher than the threshold. Accordingly, the base-station switch determination unit 606 determines whether the mobile terminal 101 should switch the connection to another more appropriate base station among the base stations 100a to 100g.

A more appropriate base station satisfies the following conditions: is able to perform communication in an area towards which the mobile terminal 101 is moving, as detected by the movement-direction detection unit 606a; the "communication possibility data" indicates that communication is possible with the mobile terminal 101; and is located furthest from the mobile terminal 101.

Figure 9:
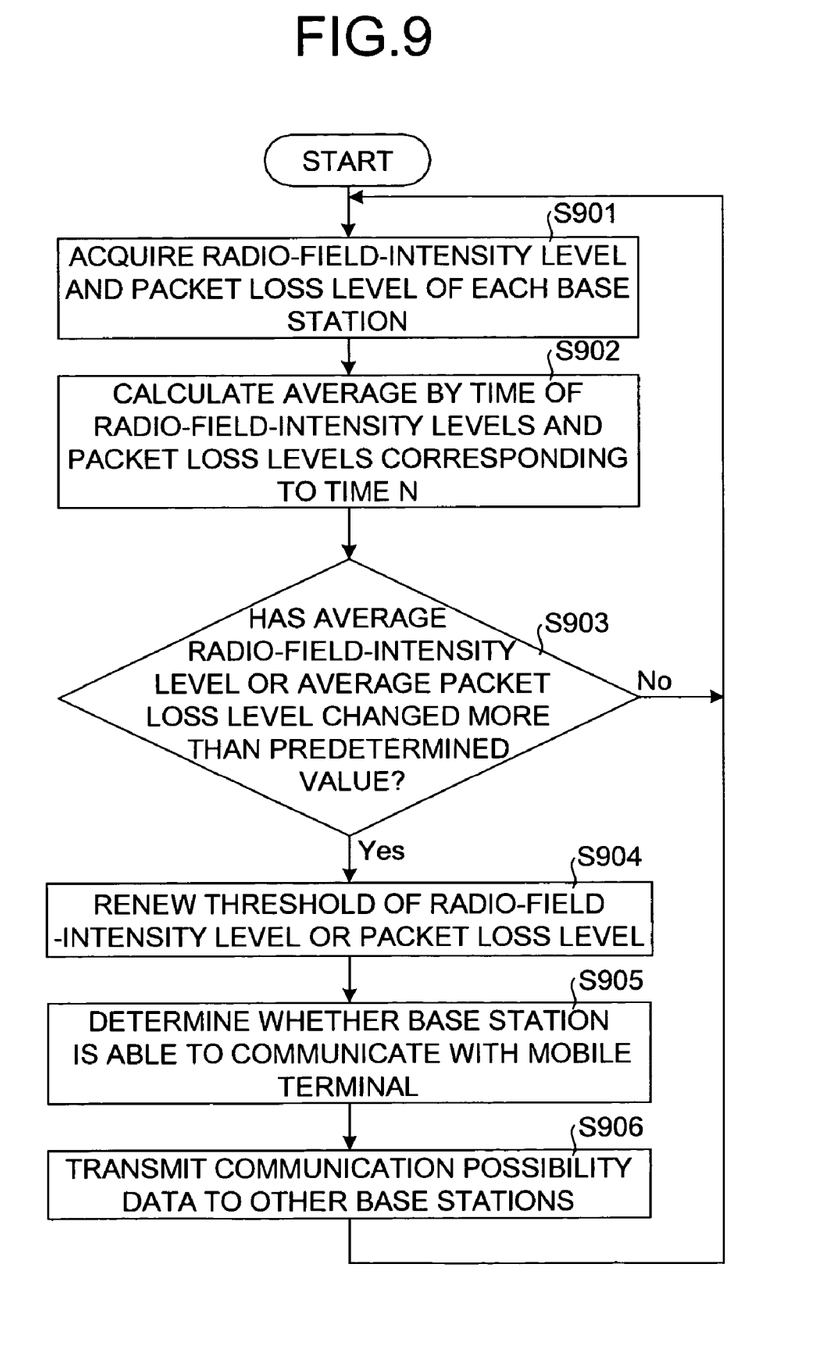
FIG. 9 is a flowchart of a threshold-renewal processing procedure performed by a base station according to a third embodiment.

FIG. 9 is a flowchart of a threshold-renewal processing procedure performed by the base station 100a according to the third embodiment.

The base station 100a acquires a radio-field-intensity level and a packet loss level between the mobile terminal 101 and each of the base stations 100a to 100g (step S901). The base station 100a calculates an average by time of the radio-field-intensity levels and the packet loss levels corresponding to a time N at which the information is acquired in step S901 (step S902).

The base station 100a determines whether the average radio-field-intensity level or the average packet loss level calculated at step S902 has changed more than a predetermined value (step S903). When the result of the determination made at step S903 is NO, the system control returns to step S901. When the result of the determination made at step S903 is YES, the base station 100a renews a threshold of the radio-field-intensity level or the packet loss level stored in the base station 100a (step S904).

The base station 100a determines whether the base station 100a is able to communicate with the mobile terminal 101, depending on whether the radio-field-intensity level is equal to or higher than the threshold and whether the packet loss level is equal to or lower than the threshold (step S905). The result of the determination made at step S905 is transmitted to other base stations 100b to 100g as "communication possibility data" (step S906).

Figure 10:
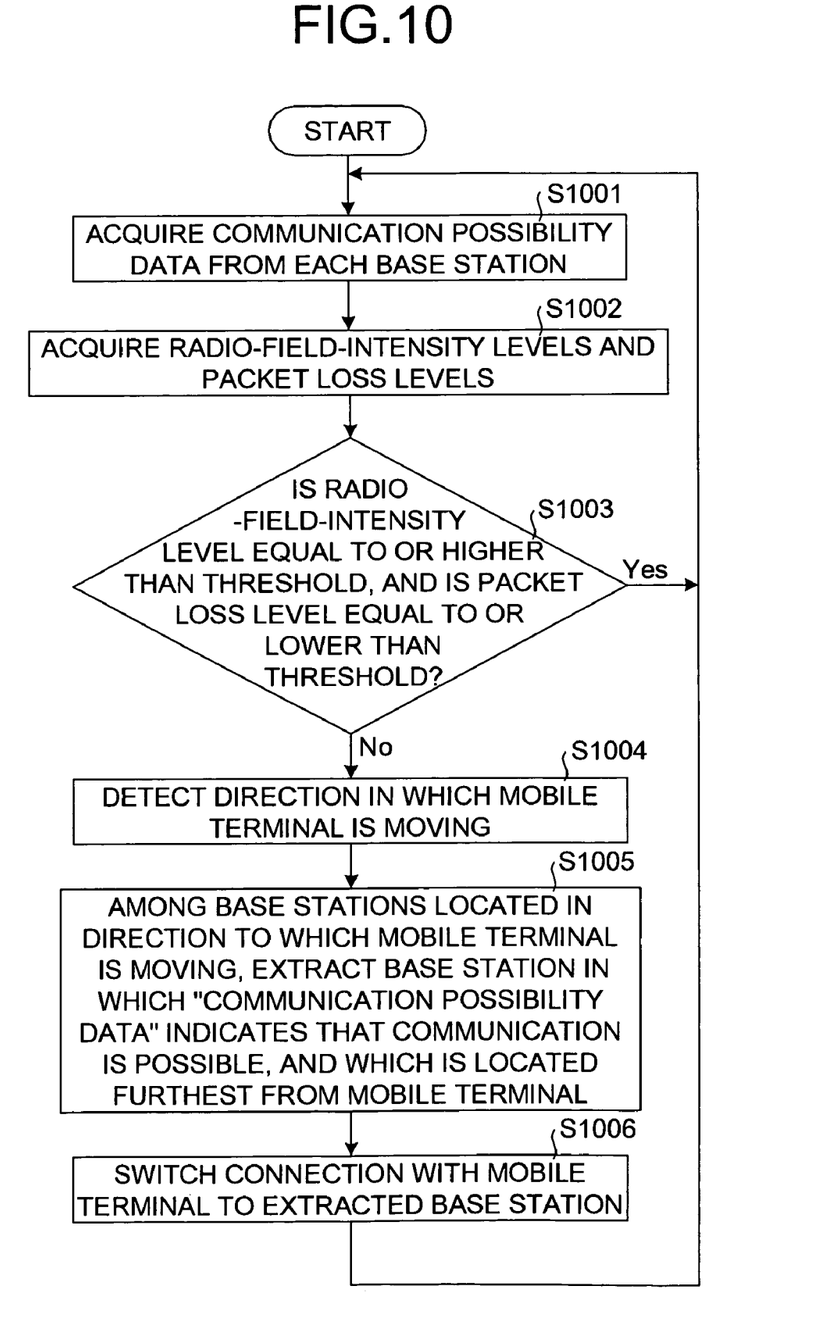
FIG. 10 is a flowchart of a base-station switching processing performed by the base station according to the third embodiment.

FIG. 10 is a flowchart of a base-station switching processing performed by the base station 100a according to the third embodiment.

The base station 100a acquires "communication possibility data" from each of the base stations 100a to 100g (step S1001). The base station 100a acquires a radio-field-intensity level and a packet loss level between the mobile terminal 101 and each of the base stations 100a to 100g (step S1002).

Regarding the base station to which the mobile terminal 101 is connected, the base station 100a determines whether the radio-field-intensity level is equal to or higher than a threshold, and whether the packet loss level is equal to or lower than a threshold (step S1003). When the result of the determination made at step S1003 is YES, the system control returns to step S1001.

When the result of the determination made at step S1003 is NO, the base station 100a refers to the communication data 604a for the highest radio-field-intensity level or the lowest packet loss level, and detects a direction in which the mobile terminal 101 is moving (step S1004).

Among the base stations located in a direction to which the mobile terminal is moving, the base station 100a extracts a base station in which "communication possibility data" indicates that communication with the mobile terminal 101 is possible, and which is located furthest from the mobile terminal 101 (step S1005). The base station 100a switches the connection with the mobile terminal 101 to the extracted base station (step S1006).

According to the third embodiment, each of the base stations 100a to 100g renews the threshold stored therein according to radio-field-intensity levels and packet loss levels transmitted from other base stations, and determines whether communication with the mobile terminal 101 is possible based on the renewed threshold. The result of the determination is notified to the other base stations 100a to 100g, so that each of the base stations 100a to 100g independently determines whether communication is possible with the mobile terminal 101. This prevents load from concentrating onto one base station.

According to a fourth embodiment, a server searches a more appropriate base station, and performs a processing to switch the connection to the more appropriate base station.

Figure 11:
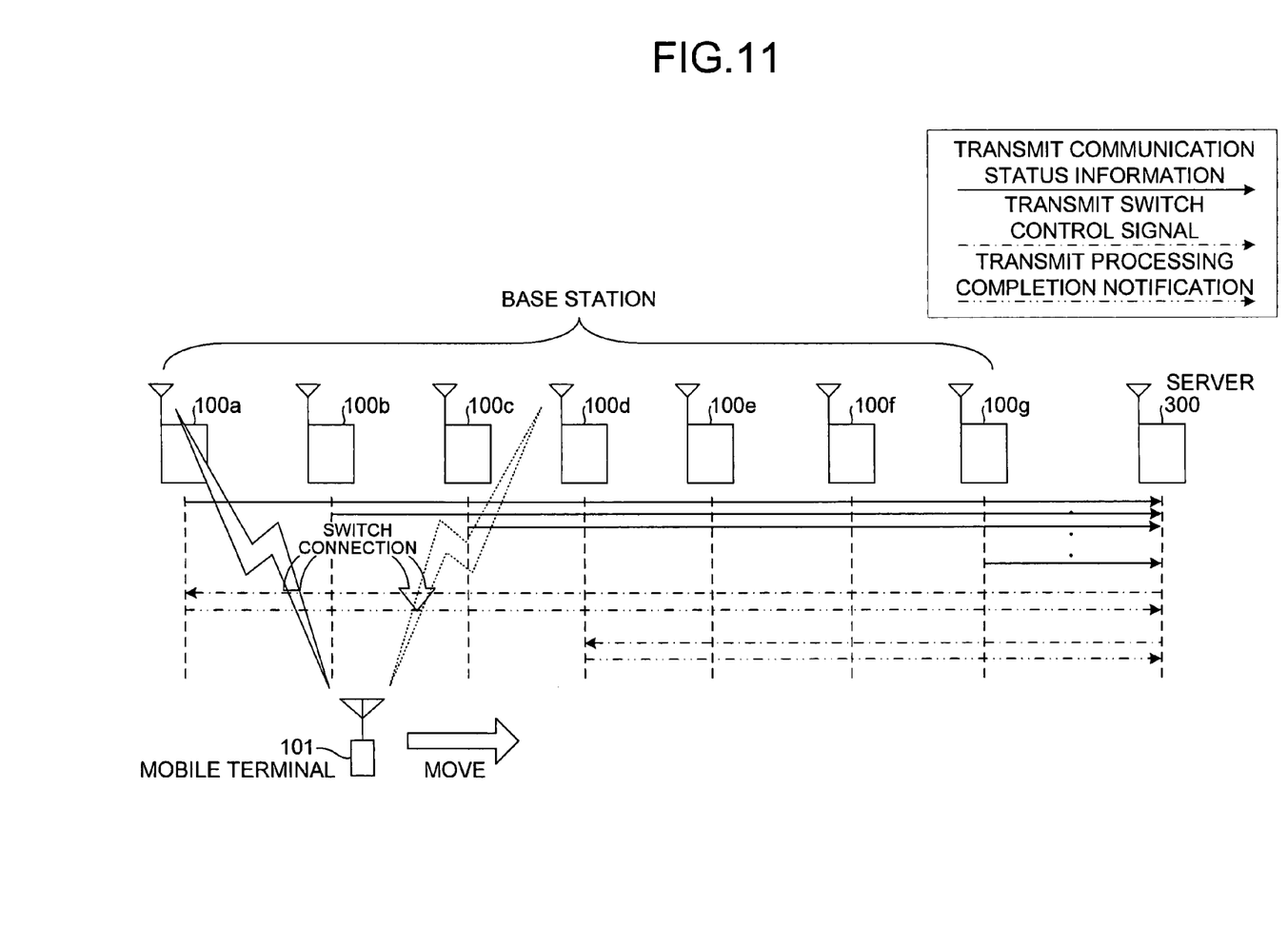
FIG. 11 is a diagram for describing a concept of a switching processing performed by a server according to a fourth embodiment.

FIG. 11 is a diagram for describing a concept of a switching processing performed by a server 300 according to a fourth embodiment.

The server 300 collects information on a communication status between the mobile terminal 101 and each of the base stations 100a to 100g. For example, when a communication status deteriorates between the mobile terminal 101 and the base station 100a, the server 300 selects the base station 100d as a more appropriate base station, and switches the connection to the base station 100d.

The base station 100d is located in a direction to which the mobile terminal 101 is moving, has a radio-field-intensity level higher than a predetermined threshold, has a packet loss level lower than a predetermined threshold, and is located furthest from the mobile terminal 101.

The functional construction of the server 300 is substantially the same as that of the mobile terminal 101 shown in FIG. 2. The difference between the mobile terminal 101 and the server 300 is that in the server 300, the base-station switch processing unit 207 transmits a switch control signal to the mobile terminal 101 and the base stations 100a to 100g, so as to switch the connection to another base station.

According to the fourth embodiment, when a communication status deteriorates between the mobile terminal 101 and one of the base stations 100a to 100g, and a radio-field-intensity level becomes lower than a threshold or a packet loss level becomes higher than a threshold, the server 300 switches the connection so that the mobile terminal 101 is connected to another more appropriate base station among the base stations 100a to 100g. A more appropriate base station is able to perform communication in an area towards which the mobile terminal 101 is moving, indicates a radio-field-intensity level higher than the threshold and a packet loss level lower than the threshold, and is located furthest from the mobile terminal 101. Accordingly, the mobile terminal 101 is required to switch a connection from one base station to another less frequently, and therefore, data communication is interrupted less frequently, so that a sufficient level of communication quality is maintained.

The present invention is not limited by the embodiments, and various modifications can be made without departing from the spirits of the invention, as described below.

Base stations located in an area that the mobile terminal has already passed through can be excluded when selecting a base station to which the connection is switched. Thus, when a mobile terminal is moving one way on a highway without turning back, a base station can be selected efficiently.

Base stations can be grouped by area, and a threshold common to base stations in the same group can be set.

Information such as a radio-field-intensity level, a packet loss level, a threshold, and a switch control signal can be communicated between base stations or between base stations and a server through a communication cable.

All the automatic processes explained in the present embodiment can be, entirely or in part, carried out manually. Similarly, all the manual processes explained in the present embodiment can be entirely or in part carried out automatically by a known method.

The sequence of processes, the sequence of controls, specific names, and data including various parameters can be changed as required unless otherwise specified.

The constituent elements of the devices illustrated are merely conceptual and may not necessarily physically resemble the structures shown in the drawings. For instance, the devices need not necessarily have the structure that is illustrated. The devices as a whole or in parts can be broken down or integrated either functionally or physically in accordance with the load or how the devices are to be used.

The process functions performed by the devices are entirely or partially realized by the CPU or a program executed by the CPU or by a hardware using wired logic.

According to the present invention, a mobile terminal is required to switch a connection from one base station to another less frequently, and therefore, data communication is interrupted less frequently, so that a sufficient level of communication quality is maintained.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile terminal configured to perform wireless communications with a base station at a time from among a plurality of base stations, comprising:

an acquiring unit that acquires a communication status between the mobile terminal and at least a first base station and a second base station from among the plurality of base stations;

a changing unit that changes a communication condition based on the communication status acquired by the acquiring unit; and a communication unit that performs wireless communications with a base station from among the first base station and the second base station of which the communication status satisfies the communication condition changed by the changing unit and that is most distant from the mobile terminal, wherein the changing unit calculates an average of values representing the communication status for at least the first base station and the second base station acquired by the acquiring unit, and changes the communication condition when a temporal change of the average exceeds a predetermined value.

2. The mobile terminal according to claim 1, wherein the mobile terminal is carried by a moving object, and the mobile terminal further comprising a direction determining unit configured to determine a direction of movement of the mobile terminal, wherein the communication unit performs wireless communications with a base station from among the first base station and the second base station based on the direction determined by the direction determining unit.

3. A base station configured to perform wireless communications with a mobile terminal, comprising:

an acquiring unit that acquires a communication status between the mobile terminal and at least a first base station and a second base station from among the plurality of base stations;

a changing unit that changes a communication condition based on the communication status acquired by the acquiring unit; and a communication unit that establishes wireless communications of the mobile terminal with a base station from among the first base station and the second base station of which the communication status satisfies the communication condition changed by the changing unit and that is most distant from the mobile terminals, wherein the changing unit calculates an average of values representing the communication status for at least the first base station and the second base station acquired by the acquiring unit, and changes the communication condition when a temporal change of the average exceeds a predetermined value.

4. The base station according to claim 3, wherein the mobile terminal is carried by a moving object, and the base station further comprising a direction determining unit configured to determine a direction of movement of the mobile terminal, wherein the communication unit establishes wireless communications of the mobile station with a base station from among the first base station and the second base station based on the direction determined by the direction determining unit.

5. The base station according to claim 3, further comprising a receiving unit that receives a communication condition from a base station from among the first base station and the second base station, wherein the changing unit changes the communication condition to received communication condition.

6. The base station according to claim 5, wherein the receiving unit receives determination data from at least the first base station and the second base station indicating whether the first base station and the second base station satisfy the changed communication condition, and the communication unit establishes wireless communications of the mobile station with a base station from among the first base station and the second base station based on the changed communication condition and the determination data.

7. A method of controlling wireless communications of at least one mobile terminal with a base station from among a plurality of base stations, comprising:

acquiring a communication status between the mobile terminal and at least a first base station and a second base station from among the plurality of base stations;

changing a communication condition based on the communication status acquired at the acquiring; and establishing wireless communications of the mobile station with a base station from among the first base station and the second base station of which the communication status satisfies the communication condition changed at the changing and that is most distant from the mobile terminal, wherein the changing includes calculating an average of values representing the communication status for at least the first base station and the second base station acquired at the acquiring, and changes the communication condition when a temporal change of the average exceeds a predetermined value.

8. The method according to claim 7, wherein the mobile terminal is carried by a moving object, and the method further includes determining a direction of movement of the mobile terminal, and the establishing includes establishing wireless communications of the mobile terminal with a base station from among the first base station and the second base station based on determined direction of movement of the moving station.

9. The method according to claim 7, further comprising receiving a communication condition from a base station from among the first base station and the second base station, wherein the changing includes changing the communication condition to received communication condition.

10. The method according to claim 9, wherein the receiving includes receiving determination data from at least the first base station and the second base station indicating whether the first base station and the second base station satisfy the changed communication condition, and the establishing includes establishing wireless communications of the mobile terminal with a base station from among the first base station and the second base station based on changed communication condition and the determination data.

* * * * *

UNITED STATES PATENT AND TRADEMARK OFFICE
CERTIFICATE OF CORRECTION

PATENT NO. : 7,583,978 B2
APPLICATION NO. : 11/239033
DATED : September 1, 2009
INVENTOR(S) : Shinichirou Miyajima et al.

It is certified that error appears in the above-identified patent and that said Letters Patent is hereby corrected as shown below:

Column 12, Line 43, change "terminals," to --terminal,--.

Signed and Sealed this

Seventeenth Day of November, 2009

David J. Kappos
*Director of the United States Patent and Trademark Office*